April 26, 1932.  J. F. HIGBEE ET AL  1,855,238
TRAILER STEERING MECHANISM
Filed Jan. 28, 1929    2 Sheets-Sheet 1
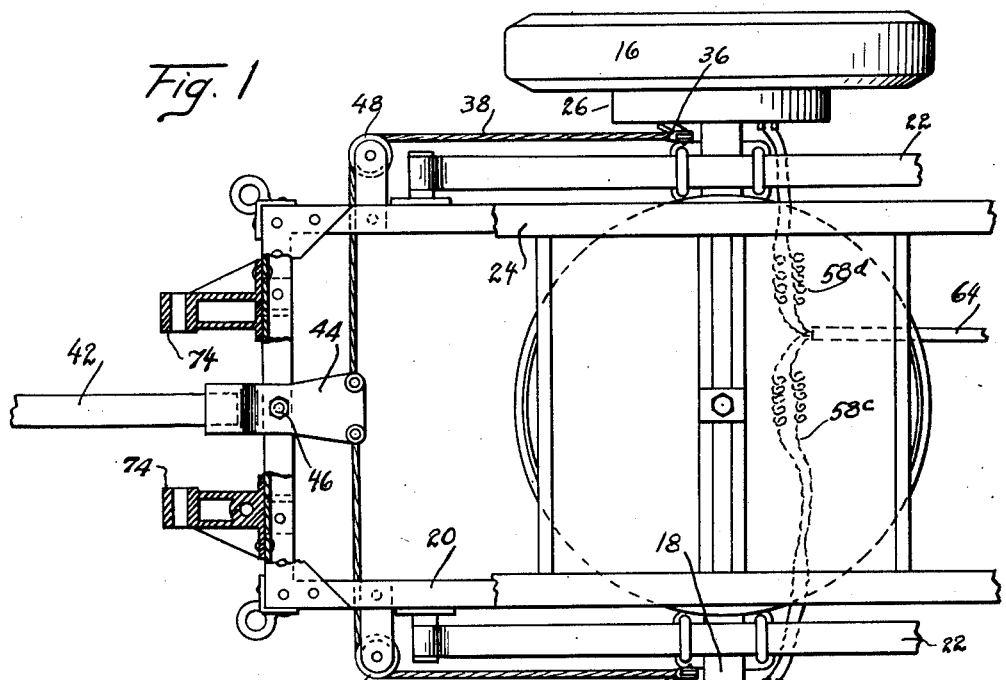
Fig. 1
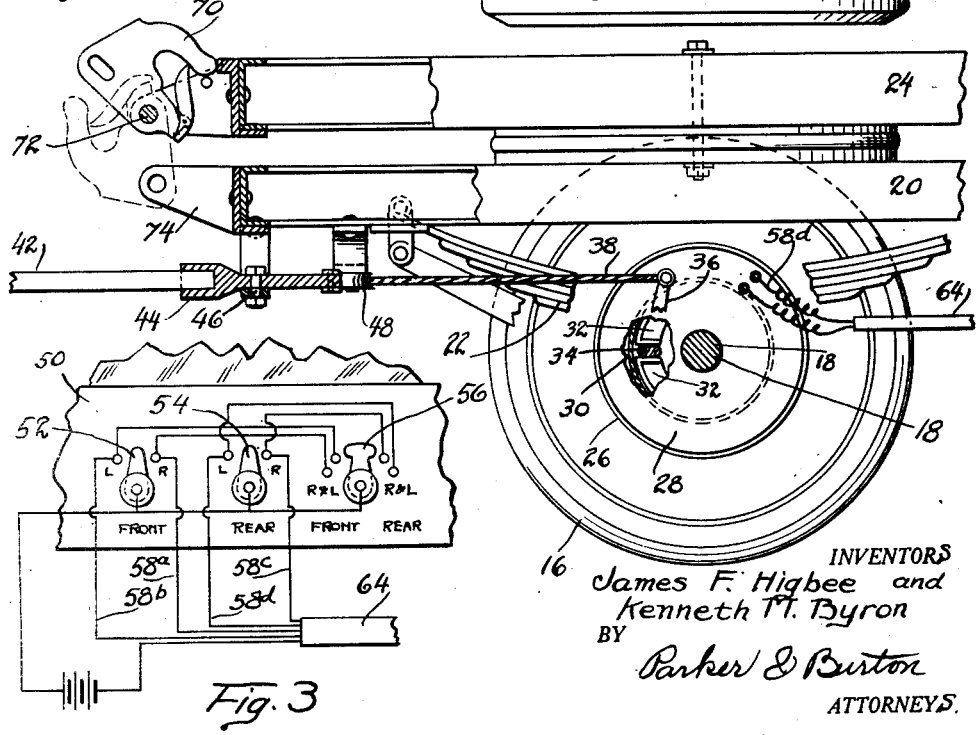
Fig. 2
Fig. 3
INVENTORS
James F. Higbee and
Kenneth H. Byron
BY Parker & Burton
ATTORNEYS.

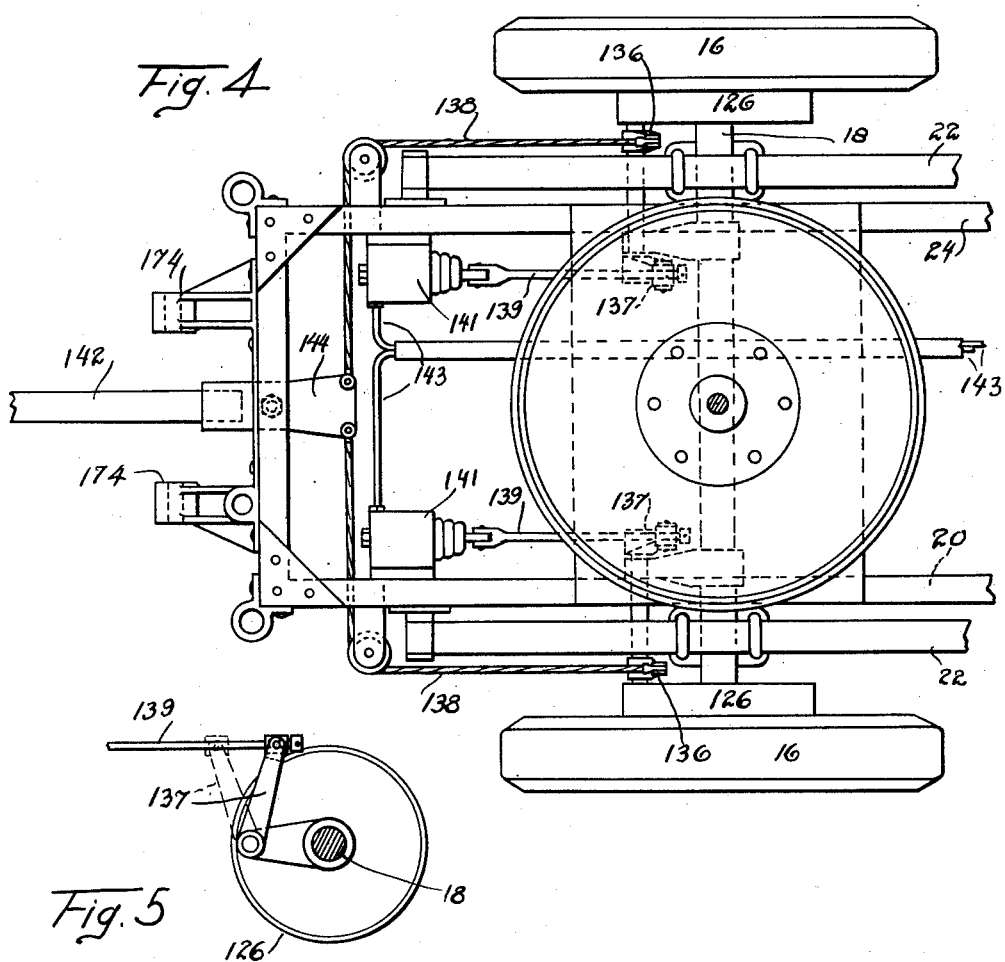
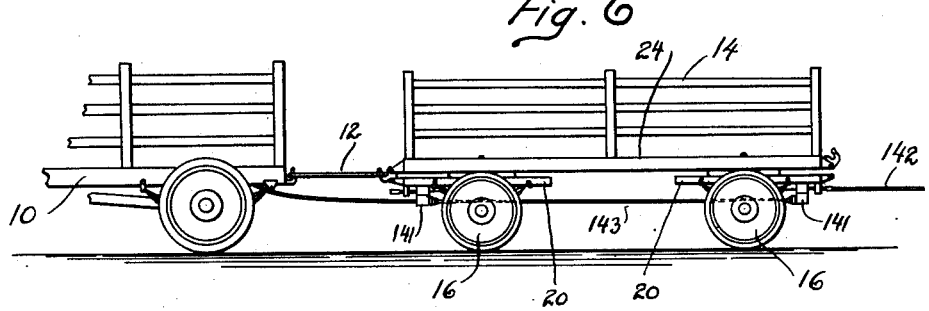

Patented Apr. 26, 1932

1,855,238

UNITED STATES PATENT OFFICE

JAMES F. HIGBEE AND KENNETH M. BYRON, OF DETROIT, MICHIGAN, ASSIGNORS TO STEPHEN A. GRIGGS, OF DETROIT, MICHIGAN

TRAILER STEERING MECHANISM

Application filed January 28, 1929. Serial No. 335,514.

Our invention relates to improvements in trailers and particularly to improved mechanism adapted to accomplish the steering of a trailer during backing and particularly a trailer of the fifth wheel type.

In a trailer of this type the axle is swiveled for turning and it has heretofore been the practice to provide a tongue which is adapted to be connected with the swiveled axle to turn the same manually when it is desired to back the trailer or the steering of the rear end when moving forwardly into position alongside a loading platform or elsewhere. This tongue is actuated by workmen on the ground and its employment is attended with considerable difficulty particularly if one wheel of the trailer engages an obstruction and frequently the services of a number of workmen are required.

An object of our invention is the provision of means operable either by a workman on the ground or by the driver of the tractor used to haul the trailer, which means is capable of being easily operated to guide the trailer during backing or to steer the rear end thereof and includes brake mechanism cooperating with certain road wheels of the trailer and adaptable to be applied to brake the wheels at one end of the axle while permitting the wheel at the opposite end to rotate freely.

Through the use of brake mechanism of this type it is possible to readily steer the trailer and we prefer to provide a plurality of operating connections to actuate the brakes and among others we have shown power means operable by the driver of the tractor to apply the brakes independently or jointly and means operable by a man on the ground to apply the brakes independently to steer the trailer.

Other objects, advantages and meritorious features of our invention will more fully appear from the following description of the embodiment thereof illustrated in the accompanying drawings and from the appended claims.

In the drawings,—

Fig. 1 is a plan of one end of a trailer embodying our invention.

Fig. 2 is a side elevation partly in section of that portion of the trailer shown in plan in Fig. 1.

Fig. 3 is an elevation of a fragment of the dash of a tractor carrying control devices.

Fig. 4 is a plan similar to that shown in Fig. 1 illustrating a modified form of my invention.

Fig. 5 is a side elevation of one of the brake drums showing a portion of the operating connections illustrated in Fig. 4.

Fig. 6 is a side elevation of the trailer embodying our invention coupled up with a tractor or other preceding vehicle.

In Fig. 6 of the drawings let 10 indicate a tractor coupled by a drawbar 12 with a trailer 14 embodying our invention. The trailer is of the fifth wheel type and is provided at each end with a swiveled axle carrying road wheels 16. In Figs. 1, 2, and 4, this axle is indicated as 18 and a sub-frame or axle truck 20 is carried thereby upon springs 22. This axle truck is swiveled as an entirety to the frame 24 of the trailer so as to permit swiveling of the axle in the guiding of the trailer.

Each of the road wheels 16 is provided with suitable brake mechanism and in Figs. 1 and 2 we have shown each road wheel as equipped with two separate brakes. In these figures of the drawings each wheel carries a brake drum 26 which is shown as provided with inwardly spaced concentric brake flanges 30. The inner brake flange 30 serves as the friction surface against which a pair of brake shoes 32 are urged by a cam 34 which is operated by an arm 36 through a cable 38.

An electric brake mechanism, (not shown), is inclosed within the drum 26 and surrounding the brake flange 30. The brake mechanism, whether of the mechanical or electrical type, does not present any novelty and may be conventional brake structure of which many different forms are well known.

If the end of the trailer shown in Figs. 1 and 2 is considered to be the rear end and it is desired to steer the vehicle, this may be accomplished either through the employment of the tongue member 42 coupled with lever 44, which is pivoted at 46 and has its opposite end connected with the two cables 38, as indicated in Fig. 1. One of these cables extends in one direction over a sheave 48 to the brake of one wheel and the other cable extends in the opposite direction over a similar sheave 48 on the opposite side of the frame to the other wheel. It will be apparent that rocking this lever 44 about its pivot 46 in one direction or the other will tend to mechanically actuate the brake of one wheel or the other to hold said wheel against rotation which, during the backing of the vehicle, will cause the vehicle to swing upon said wheel and accomplish the turning of the vehicle.

If it is desired to manipulate the brakes without the employment of a workman on the ground, this may be accomplished through the electric control provided for the electric brakes which is operable from the dash of the tractor. In Fig. 3 a fragment of the dash is illustrated as 50, having switches 52, 54 and 56 mounted thereon. By turning the switch 52 to right or left an electric circuit is established through the leads 58a or 58b to operate either the right or left brake respectively on the front trailer truck. The switch 54 controls the operation of the right or left brake on the rear trailer truck through the leads 58c or 58d respectively. The switch 56 controls the operation of both right and left brakes simultaneously on either the front or rear trailer trucks by bridging the double contacts at either right or left. The wires from the brakes may be housed in a conduit 64, if such is desired.

It will be apparent that this control mechanism provides a convenient form of control operable from the dash of the vehicle.

In Fig. 4 we have shown a construction of a similar character wherein the usual mechanical operating mechanism of the cable is provided, which is here indicated as 138, leading to brake mechanism not shown located within brake drums 126, and these cables are connected to the lever 144 which may be actuated by a tongue member 142 in the manner hereinbefore described. In this construction each brake-operating shaft is provided with a pair of operating arms. There is the arm 136 to which the cable is connected and in addition there is an arm 137 to which is connected a link 139 that leads to power means such as a vacuum cylinder 141 mounted upon the frame and adapted to create a force tending to apply the brake by power pressure.

In Fig. 4, two of these vacuum cylinders 141 are illustrated and they are connected by suitable conduits 143 with a suitable source of suction, and the control of which to either vacuum cylinder may be regulated by the driver to apply both brakes or either brake as the desire may be. Such a construction is of course alternative with the electric control.

The connection of the link 139 with the arm 137 is an overrunning connection so that the mechanical application of the brakes by the cable 138 is freely permitted. There is also shown in Fig. 2 locking mechanism in the form of a hook 70 pivoted at 72 to the trailer frame 24 and adapted to be lowered and engaged with a part 74 on the axle truck frame to lock the axle truck to the trailer frame but this particular construction which includes the drawbar connection does not form any part of this invention but is described and claimed in a separate application identified as Ser. No. 332,007, January 12, 1929.

This improved construction is useful not only in steering the trailer during backing but to swing the rear end of the trailer into position sideways alongside a loading platform or dock.

What we claim is:

1. In combination with a tractor, a trailer coupled thereto to be drawn thereby, said trailer having, a pair of road wheels swiveled at its rear end for turning, a brake associated with each wheel, and brake operating mechanism connected with said brakes and leading to the tractor whereby either brake may be operated independently of the other.

2. In combination with a tractor having steering mechanism, a trailer of the fifth wheel type coupled thereto to be drawn thereby, said trailer provided with a swiveled rear axle carrying a wheel at each end, independent steering mechanism for the trailer including a brake associated with each rear wheel, brake operating connections, and an operating member on the tractor disposed in proximity to the steering mechanism therefor, connected with said brake operating connections whereby either brake may be operated independently of the other.

3. In combination with a tractor having steering mechanism, a trailer coupled thereto to be drawn thereby, said trailer provided with a rear axle swiveled for turning and having a wheel mounted on each end, independent steering mechanism for the trailer comprising a brake associated with each rear wheel, an operating connection leading from each brake and an operating member on the tractor connected with said brake operating connections to actuate the brakes, said operating member operable to be swung in one direction to operate the brake on one of said wheels and in the opposite direction to operate the brake on the other of said wheels.

4. In combination with a tractor, a trailer coupled thereto to be drawn thereby, said trailer provided with a rear axle swiveled for turning and having a wheel mounted on each end, a brake associated with each wheel on the axle, an operating member on the trailer connected with each brake whereby said brakes may be individually actuated by the operating member independently of each other, and an operating member on the tractor connected with each brake whereby said brakes may be individually actuated by said operating member independently of each other.

5. The invention as defined in claim 1 wherein the brake operating mechanism is provided with means operable to apply the brakes on both wheels at the same time to retard the movement of the vehicle.

6. In combination with a tractor, a trailer coupled therewith to be drawn thereby and having a pair of road wheels swiveled at the rear end of the trailer for turning to steer the trailer during backing, a brake for each wheel and brake operating mechanism coupled with said brakes to apply them individually to steer the trailer during backing and jointly to retard the travel of the trailer.

7. In combination with a tractor, a trailer coupled therewith to be drawn thereby, said trailer having a pair of road wheels swiveled at the rear end thereof for turning to steer the trailer during backing, a brake for each wheel, brake operating mechanism including a manually operable member connected therewith to apply the brakes individually, and brake operating mechanism mounted on the tractor and coupled with the brakes on the trailer to apply them jointly to retard the vehicle.

8. In combination with a tractor, a trailer coupled therewith to be drawn thereby, said trailer provided with a pair of road wheels swiveled at one end thereof for turning, a brake for each wheel, brake operating mechanism mounted on the tractor and coupled with the brakes on the trailer to apply them jointly or individually, and a brake operating device mounted on the trailer operable to apply said brakes individually.

9. In combination with a trailer having a swivelled road wheel supporting truck, brakes for each wheel, and a single means extending away from said trailer at a height less than that of the ordinary individual and connected with each of said brakes and operable by an individual on the ground at the rear of the trailer whereby either of said brakes may be actuated independently of the other.

In testimony whereof we, JAMES F. HIGBEE and KENNETH M. BYRON, sign this specification.

JAMES F. HIGBEE.
KENNETH M. BYRON.